Aug. 24, 1926.
E. S. ALLEN
EDUCATIONAL DEVICE
Filed Jan. 22, 1926
1,597,562
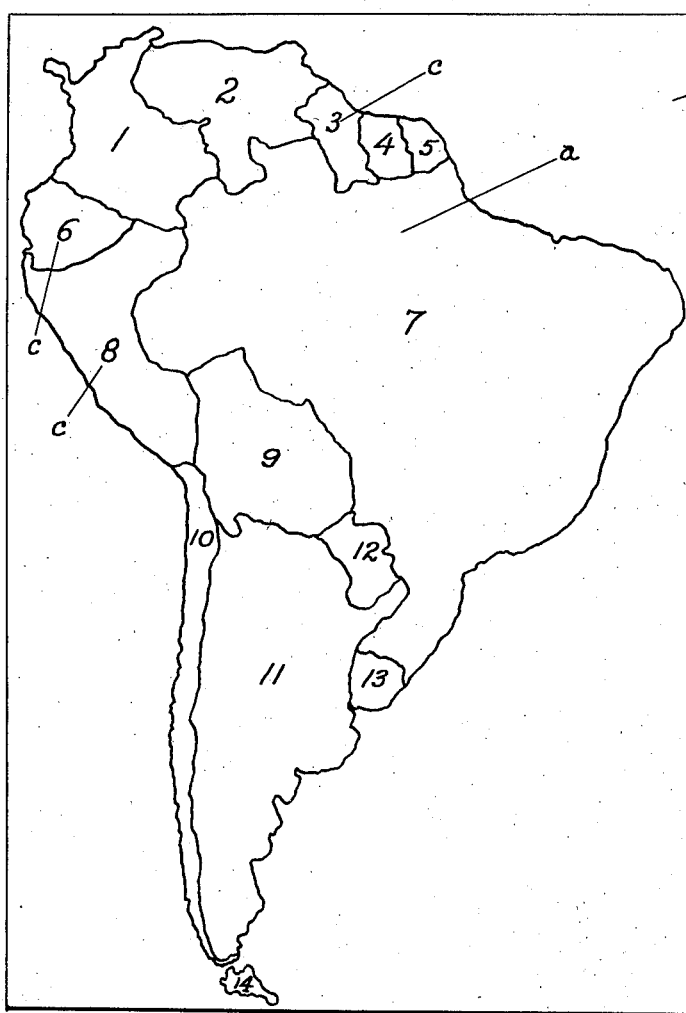

Patented Aug. 24, 1926.

1,597,562

UNITED STATES PATENT OFFICE.

ERASTUS S. ALLEN, OF GLENDALE, OHIO.

EDUCATIONAL DEVICE.

Application filed January 22, 1926. Serial No. 82,911.

My invention relates to the general class of educational devices and particularly to such devices as relate to the science of geography.

It is the object of my invention to provide a game in which any desired number of players may participate which shall be amusing and which will at the same time provide a test for the knowledge of the different participants on the particular geographical subject employed.

Specifically it is the object of my invention to provide a map in which different countries, rivers or cities are indicated in some convenient manner as by letters or figures. Accompanying the map it is my object to provide a list or a plurality of lists in which the actual names of the countries, rivers or cities are given in a confused arrangement so that participants in the contest will have no clue from the indicia on the map as to the correct sequence of geographical locations on the list. The contestants will be required to supply the correct index for each of the geographical locations and the contest will consist in the comparison of the lists of each of the participants as compared with a key chart which reveals the correct index for each of the locations so that their location will be firmly fixed in the mind of each of the players.

Particularly for gatherings of a number of people where there are too many to play cards or other games requiring a definite number of players, my game offers an interesting and educational opportunity for any number of people to contest.

Referring to the drawings in which I have indicated one example of a device embodying my invention:

Figure 1 is a map of South America with the different countries indicated by numbers.

Figure 2 is a list showing the names of the different South American countries in a confused and out of sequence arrangement with a space after each name in which the contestant will write his idea of the correct index on the map.

Figure 3 is a key chart in which the correct index for each of the countries on the list is given.

Figure 4 is a list of an average contestant showing how the score may be determined so as to grade the knowledge of the different players.

For illustrating my invention I have shown a map of South America generally indicated at $a$ and preferably mounted on a suitable backing piece $b$. The map will be of suitable size and the backing piece of suitable strength so that it may be displayed prominently to all the contestants. The countries are indicated in the illustration by different ordinals as at $c$. A series of pieces as indicated at $d$ in Figures 2 and 4 are provided on which are inscribed the names of different countries as at $e$, which are indicated by ordinals on the map, the position and sequence of the names of the countries being arranged in a confused order with respect to the natural order of the ordinals. The pieces $d$ have a suitable designated space as at $f$ aligned with each of the names of the countries so that each contestant may mark on the sheet his idea of the correct index for each name. After all the contestants have marked their pieces one of the party procures the key piece indicated at $g$ in Figure 3 and reads aloud the correct index for each country as shown in aligned position with each respective name. Each contestant may then mark his piece $d$ with a cross opposite each country which he has not marked with the correct index. Figure 4 shows a typical marked piece at the end of the contest. It will be preferable to provide each one of the pieces with a score line as indicated at $h$ on which each contestant may write his score.

It will be obvious that my educational device offers a broad range of modifications. Maps of different countries will be prepared in which different geographical divisions (or entities,) such as cities, rivers and mountains are indexed. It is proposed as a convenient form of supplying the device that a series of maps of different localities be provided on one container in which are also provided separate slips or tablets having the names of the different geographical locations printed on them, and in which a key is also provided for each map preferably in a sealed envelope.

A further embodiment of my invention is adapted for use in newspapers and periodicals in which in one issue the map and a name piece are printed with the key piece reserved for publication in a subsequent issue.

Having thus described my invention, what I claim as new and desire to secure by Letters Patent, is:—

1. An educational device comprising at least one map element having geographical entities indicated thereon with indicia having a natural sequence, and without names, and at least one list-of-names element with the names arranged in confused order with relation to the sequence of the indicia on said map element.

2. An educational device comprising at least one map element having geographical entities indicated thereon with indicia having a natural sequence, and without names, and at least one list-of-names element with the names arranged in confused order with relation to the sequence of the indicia on said map element, and a key element having thereon a list of names with the correct indicia for said names associated with the names on said key element.

3. An educational game consisting in a series of map elements, each map having geographical entities indicated thereon with indicia having a natural sequence, and without names, and a series of lists for each map element, said lists having the names of the geographical entities arranged thereon in confused order with relation to the sequence of said indicia.

4. An educational game consisting in a series of map elements, each map having geographical entities indicated thereon with indicia having a natural sequence, and without names, and a series of lists for each map element, said lists having the names of the geographical entities arranged thereon in confused order with relation to the sequence of said indicia, and a key chart for each of said map elements.

5. An educational game consisting in a series of map elements, each map having geographical entities indicated thereon with indicia having a natural sequence, and without names, and a series of lists for each map element, said lists having the names of the geographical entities arranged thereon in confused order with relation to the sequence of said indicia, said lists having spaces associated with the names thereon for the insertion of indicia.

ERASTUS S. ALLEN.